Oct. 28, 1969   H. SHUMWAY   3,475,080
SAFETY VISOR WITH POLYMETHYLMETHACYRYLATE TINTED SHEETS
Filed Sept. 30, 1966

INVENTOR
Harry Shumway
BY De Lio and Montgomery
ATTORNEYS 3,475,080
SAFETY VISOR WITH POLYMETHYLMETH-
ACRYLATE TINTED SHEETS
Harry Shumway, Naugatuck, Conn., assignor to
Williams S. Savo, New Haven, Conn.
Filed Sept. 30, 1966, Ser. No. 583,271
Int. Cl. G02b 27/00; B60j 3/00
U.S. Cl. 350—276                             1 Claim

ABSTRACT OF THE DISCLOSURE

An adjustable transparent sun visor, comprising two transparent sheets, one of which sheets is an amber-tinted sheet whose transmittance ranges from about 10% for light having wavelengths up to 4000–4600 angstroms and approximately 40–90% for light having wavelengths of 4600 angstroms and greater. The other sheet is a green-tinted sheet whose transmittance ranges from about 20–60% for light having wavelengths of about 5000–5500 angstroms and less than about 20% for light having wavelengths below 5000 angstroms or above 5500 angstroms. Further, the amber-tinted sheet has a total white light transmission of 80–90% and the green-tinted sheet has a total white light transmission of 20–30%. The sun visor also includes means for the use of said amber-tinted sheet alone or in combination with said green-tinted sheet.

---

This invention relates to transparent sun or safety visors for use in automotive vehicles, for the purposes of reducing glare, increasing vision and thus improving safety under varying atmospheric conditions.

The use of opaque adjustable sun visors is common to practically all automotive vehicles at present, for the purpose of shielding the driver from the direct rays of the sun. The use of tinted windshields wherein all or, in some cases only the upper part of the windshield, is tinted to reduce glare is also well known. However, the use of these means has certain disadvantages. The opaque visor obstructs all vision in the area to which it is adjusted and cannot afford complete protection when the vehicle is being driven in the direction of the setting sun. Tinted windshields have the advantage of reducing glare without completely obscuring vision, but cannot be removed under conditions when there are no glare problems, such as after dark or in the dusk, when further reduction of the remaining light is undesirable.

Applicant has discovered that the use of a combination of two adjustable, transparent, specially tinted sheets in a safety visor, so that they can be used separately or together, as required, makes it possible for the driver or the operator of a vehicle to adjust readily to all types of conditions. This double visor allows the driver to employ an amber tinted transparent plastic sheet visor in place of the common opaque visor and combine this with a green tinted, transparent plastic sheet visor when necessary, for example, when operating the vehicle while facing directly into the sun or under unusual glare conditions due to the combination of bright sunlight with snow or sand.

Accordingly, an object of this invention is to provide an adjustable, transparent sun visor comprising two specially tinted films which may be used separately or together, as required.

Another object of this invention is to provide an adjustable, transparent sun visor for an automotive vehicle, comprising two specially tinted films which may be used alone or together, as required.

Still other objects and advantages of the invention will in part be obvious and will in part be apparent from the specification.

Figure 1:
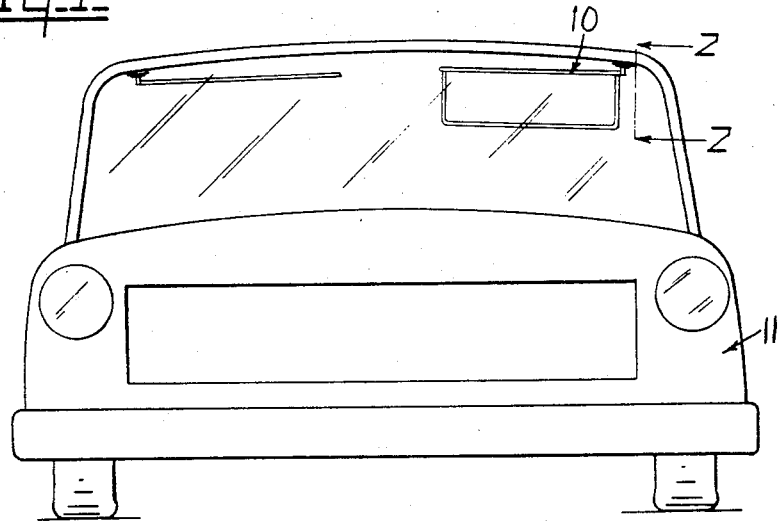
Figure 2:
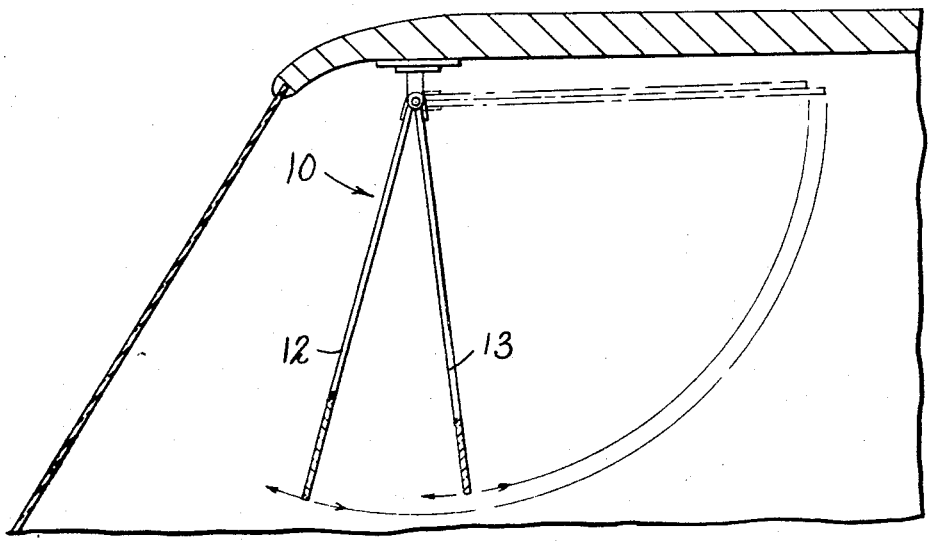

For a fuller understanding of the invention, reference is had to the following description, taken in connection with the accompanying drawings, in which FIG. 1 is a front view of an automobile showing the position of a visor according to this invention; and FIG. 2 is a view taken along line 2—2 of FIG. 1.

Referring to FIGS. 1 and 2, the safety visor of the subject invention comprises a double transparent film visor 10 mounted in an auto 11. The visor is similar to the present opaque sun visor but consists of two transparent tinted sheets installed in such a manner that the lower, amber-tinted sheet 12 may be pulled down and adjusted as required, while the upper green-tinted sheet 13 may be pulled down over the amber sheet, as required. The double film visor, except for the transparent nature and special tinting of its films, is otherwise substantially identical to the ordinary opaque visor means now in use. Its structure and installation will not be specifically described since it would be obvious to one familiar with the present opaque visors. Obvious variations in size, shape and structure would also be apparent.

Critical to the operation of applicant's invention are the light transmittance characteristics of the amber and the green transparencies over the various wavelengths of the spectrum. Alone and in combination, they must allow sufficient light transmission for proper perception and sufficient shielding to permit vision without blinding and subsequent headaches, etc., due to excessive glare.

The amber transparent visor sheet must be such that light transmission ranges from about 10% for light having a wave length up to 4000 to 4600 angstroms and approximately 40–90% for light having a wavelength of 4600 angstroms or greater. The sheet should have a total transmission for white light of about 80–90%. These characteristics may, for example, be obtained with "Plexiglas" polymethylmethacrylate transparent colored sheet No. 2092, as manufactured by the plastics department of Rohm and Haas.

The green transparent visor sheet transmits about 20–60% of light having a wavelength in the range of about 5000 to 5500 angstroms. Transmission of light with a wavelength above or below this range is less than about 20%. The sheet should have a total white light transmittance of about 20–30%. These characteristics may, for example, be obtained with "Plexiglas" polymethylmethacrylate transparent colored sheet No. 2092.

Experimental studies have demonstrated that by the use of the amber sheet, glare is substantially eliminated and visual acuity is increased. Accordingly, the amber sheet can be used on dull, cloudy, rainy or hazy days to improve vision. It can also be employed for night driving without lowering visual acuity since it produces an effective reduction of glare from approaching headlights.

Although the methylmethacrylate tinted sheets previously noted are suitable for the tinted visors of this invention, any transparent sheeting of plastic and/or glass with the desired. optical properties may be used.

The combined use of the amber and green transparent sheets of the visor is essential when the vehicle must be driven directly into the westering sun. Vision is greatly increased by the synergistic light filtration brought about by the combination of the amber and green sheets which removes harmful rays without reducing the total available lighting for effective driving. This combination is also useful when snow and ice are on the ground, to prevent excessive glare and resultant snow-blindness. The combination of the amber and green sheets of the visor thus affords protection and safety under extremely hazardous lighting conditions.

The heart of applicant's invention lies in the critical optical characteristics of the two visors. The amber sheet prevents glare and improves vision under more or less normal conditions. To be effective, the total light transmittance must be high with substantial removal of the lower visual wavelengths. Under unusually hazardous light conditions, combination with the green sheet for removal of a large portion of the light having a wavelength of 5000 to 5500 angstroms has been found essential to good vision since it does not remove sufficient light to reduce effective visual acuity under these conditions.

It should be noted that although applicant's invention is particularly useful for improving safety in the operation of automobiles, trucks, buses, motorcycles, scooters and the like, it may also be used in aeroplanes, helicopters, trains, boats and the like. In addition, it may be utilized in specialized sun visors for use in homes, offices and for individual use in sports such as skiing, shooting, tennis, horse racing, or other sports.

It will thus be seen that the objects set forth above, among those made apparent from the preceding description, are efficiently attained and since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An adjustable transparent sun visor comprising two transparent sheets, one of which is an amber-tinted polymethylmethacrylate sheet whose transmittance ranges from about 10% for light having wavelengths up to 4000–4600 angstroms and approximately 40–90% for light having wavelengths of 4600 angstroms and greater, and the other is a green-tinted polymethylmethacrylate sheet whose transmittance ranges from about 20–60% for light having wavelengths of about 5000–5500 angstroms and less than about 20% for light having wavelengths below 5000 angstroms or above 5500 angstroms, said sun visor comprising means for use of said amber-tinted sheet alone and in combination with said green-tinted sheet wherein the amber-tinted polymethylmethacrylate sheet has a total white light transmission of 80–90% and the green-tinted polymethylmethacrylate sheet has a total white light transmission of 20–30%.

References Cited

UNITED STATES PATENTS 3,105,718   10/1963   Ralls _____ 350—276 X

FOREIGN PATENTS 923,626   4/1963   Great Britain.

DAVID SCHONBERG, Primary Examiner

T. H. KUSMER, Assistant Examiner

U.S. Cl. X.R.

296—97